Aug. 21, 1956 R. S. GRAHAM ET AL 2,760,164
EQUALIZER
Filed April 22, 1955
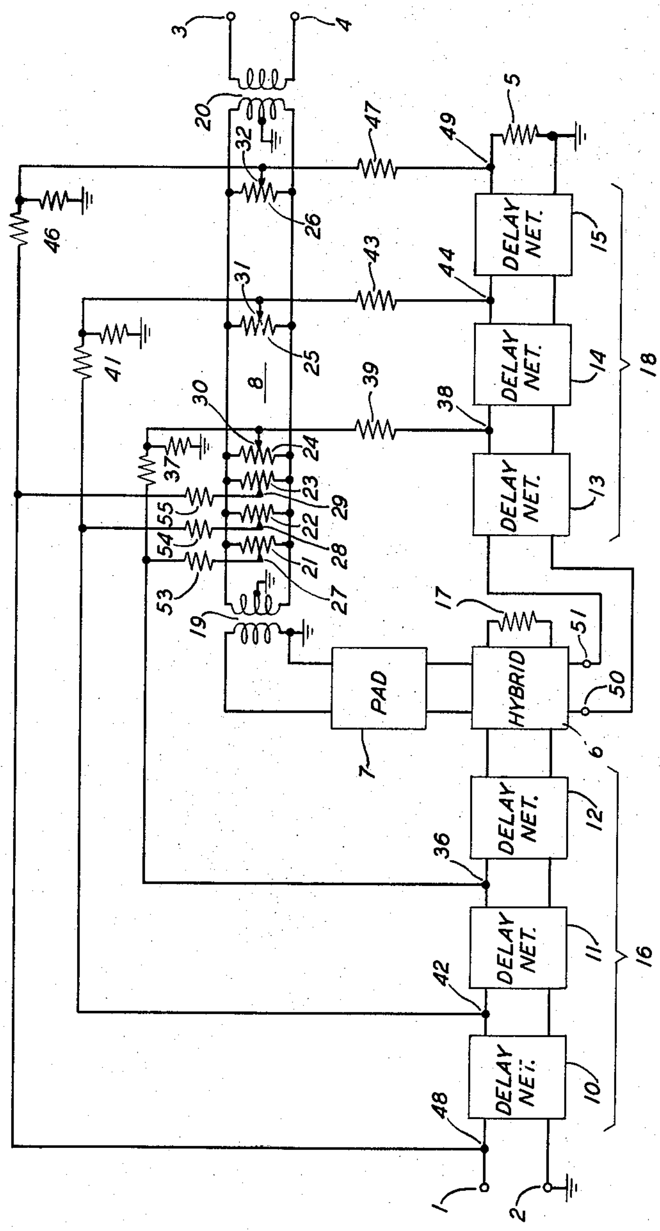
INVENTORS R. S. GRAHAM
R. V. SPERRY
BY Ralph T. Holcomb
ATTORNEY United States Patent Office 2,760,164

Patented Aug. 21, 1956

2,760,164

EQUALIZER

Robert S. Graham, Bernardsville, and Robert V. Sperry, New Providence, N. J., assignors to Bell Telephone Laboratories, Incorporated, New York, N. Y., a corporation of New York Application April 22, 1955, Serial No. 503,182

23 Claims. (Cl. 333—28)

This invention relates to wave transmission networks and more particularly to adjustable loss and delay equalizers.

The principal object of the invention is to equalize for loss and delay deviations such as occur in broadband wave transmission systems. Another object is to provide either pure delay equalization or pure loss equalization in an equalizer for this purpose. Another object is to provide both loss and delay equalization in a single equalizer. A further object is to provide a series of harmonically related loss shapes and a series of harmonically related delay shapes which may be adjusted individually to provide any desired transmission characteristic. Another object is to eliminate active elements in an equalizer of this type.

In wave transmission systems, such as television and other broad-band circuits, it is necessary to equalize for the loss and delay distortion of the signal as it is transmitted over the line. To facilitate lining up the circuit, it is preferable that either pure delay or pure loss equalization be available, and that the equalization shapes be independently adjustable. Equalizers which have a series of harmonically related frequency characteristics have the advantage that, if a sufficient number of shapes are provided, any desired transmission characteristic may be simulated to any required degree of precision. From the standpoint of simplicity of structure, cost and maintenance, it is also advantageous to eliminate active elements in the equalizer.

The adjustable loss and delay equalizer of the present invention possesses all of these advantages. Without requiring active elements, it provides a series of harmonically related frequency characteristics which may be adjusted individually to provide any desired loss or delay characteristic. The equalizer comprises a terminated, unbalanced, delay line from the center of which the main signal is taken off and impressed upon a balanced summing circuit which includes shunt resistors each with an adjustable tapping point. Corresponding pairs of leading and lagging voltages are also picked off from the delay line at appropriately spaced points in each half thereof. Each pair of voltages is impressed upon a different one of the tapping points to provide a series of adjustable frequency characteristics. If there is a phase reversal introduced at the center of the delay line, these characteristics will be substantially pure delay equalization shapes. If there is no phase reversal at this point, they will be substantially pure loss equalization shapes.

In order to provide the other type of equalization, either all of the leading voltages or all of the lagging voltage are impressed individually upon other tapping points in the summing circuit. Adjustment of these latter tapping points gives a series of loss shapes and associated minimum-phase delay shapes. If lagging voltages are used, these delay shapes may be designated as positive; for leading voltages, the delay shapes will then be negative.

In operation, the combined loss-and-delay shapes are preferably adjusted first. If the pairs of voltages give pure delay equalization, the combined shapes are adjusted to equalize the loss and then the pure-delay shapes are adjusted to equalize all of the delay distortion. But if the pairs of voltages give pure loss equalization, the combined shapes are adjusted to equalize the delay and then the pure-loss shapes are adjusted to compensate for all of the loss distortion. When this procedure is followed, no readjustment of the combined shapes is required.

The nature of the invention and its various objects, features and advantages will appear more fully in the following detailed description of a typical embodiment illustrated in the accompanying drawing, the single figure of which shows the schematic circuit of an adjustable loss and delay equalizer in accordance with the invention.

The equalizer has a pair of input terminals 1, 2 to which may be connected a suitable source, not shown, of alternating-current signals to be equalized, and a pair of output terminals 3, 4 to which a suitable load, not shown, may be connected. An unbalanced delay line is connected at its input end to the terminals 1, 2 and is terminated at its other end in a matching impedance 5. The main signal is taken off at the center of the delay line through a hybrid device 6, attenuated in a pad 7, and impressed upon one end of a balanced summing circuit 8, to the output end of which the terminals 3, 4 are connected.

The delay line comprises an even number of unbalanced delay networks 10 to 15, of any suitable type, connected in tandem. They may, for example, be constituted by either lumped elements or distributed elements, such as lengths of coaxial or other cable. These networks preferably have matching image impedances and each has a phase-frequency characteristic which is ordinarily substantially linear with frequency in the band to be equalized, but under some circumstances may be intentionally warped. Each of the networks 10 to 15 will ordinarily have a phase shift which increases by 180 degrees, or an integral multiple thereof, over the band, but it is only necessary that they be equal in pairs. For example, the end networks 10 and 15 will have the same phase characteristics.

The hybrid device 6, which may be of any suitable type, is inserted at the center of the delay line. It has two pairs of conjugate terminals to which the first half 16 of the delay line and a balancing impedance 17 are connected, respectively, and two other pairs of conjugate terminals to which the second half 18 of the delay line and the pad 7 are connected, respectively. The function of the hybrid 6 is to split the energy into two parts and at the same time to maintain a conjugate relation between the second half 18 of the delay line and the pad 7.

The output end of the pad 7 is connected to the summing circuit 8, which comprises an unbalanced-to-balanced transformer 19, a transformer 20, and a plurality of interposed shunt resistors 21 to 26 with adjustable tapping points 27 to 32, respectively.

As compared with the main signal fed to the combining circuit 8 from the hybrid 6, it is apparent that a series of three leading voltages may be obtained from properly selected, spaced points in the input half 16 of the delay line, and three corresponding lagging voltages from the output half 18. Each pair of these voltages is impressed upon a different one of the points 30, 31 and 32. Thus, the point 36 at the input end of the delay network 12 is connected through a dropping pad 37 to the tapping point 30, and the point 38 at the output end of the delay network 13 is connected through a dropping resistor 39 also to the point 30. Similarly, the tapping point 31 is connected through the pad 41 to the point 42 and through the resistor 43 to the corresponding point 44, and the tapping point 32 is connected through the pad 46 and the resistor 47 to the corresponding points 48 and 49, respectively.

The pad 7, the dropping pads 37, 41 and 46, and the dropping resistors 39, 43 and 47 are inserted to reduce the shunting effect on the delay line of the resistors 21 to 26 in the combining circuit 8. The dropping pads and resistors are so chosen that the leading and lagging voltages in each pair are of approximately the same magnitude. For example, the pad 46 and the resistor 47 are so selected that the leading voltage derived at the point 48 in the delay line and the lagging voltage from the point 49 are substantially equal when applied to the tapping point 32 of the resistor 26. The pads 37, 41 and 46 are preferably L-type structures, rather than simple series resistors, so that they will introduce an advantageous impedance transformation.

Assuming that each of the delay networks 10 to 15 has a phase shift which increases linearly from zero to 180 degrees over the band, the portion of the equalizer so far described in detail will provide three adjustable, harmonically related, cosine-shaped, deviation characteristics which may be either substantially pure delay or substantially pure loss. The positions of the tapping points 30, 31 and 32 control, respectively, the fundamental and the second and third harmonic characteristics. When these tapping points are at the electrical centers of the resistors 24, 25 and 26, respectively, the loss and delay will be substantially constant over the band and all of the deviation characteristics will have zero amplitude. As these points are moved away from the central position, the magnitudes of the equalization characteristics increase, and the sign depends upon the direction of adjustment. For example, if there is no phase reversal in either the hybrid 6 or the transformer 19 and the point 32 is moved upward, a positive fundamental deviation characteristic is introduced. These adjustments are substantially independent of each other.

If it is desired that the tapping points 30, 31 and 32 control pure delay equalization shapes, the hybrid device 6 is so constructed, and the second half 18 of the delay line is so connected to the terminals 50, 51, that the phase of the incoming signal is reversed as it is transmitted from the first half 16 through the hybrid 6 to the second half 18. On the other hand, to get pure loss shapes, there should be no phase reversal introduced at the center of the delay line. This phase reversal may be controlled by changing the internal wiring of the hybrid 6 or by reversing the connections of the half 18 to the hybrid terminals 50, 51, if required.

In accordance with the invention, the other type of equalization, loss or delay, is also provided in the same equalizer. The resistors 21, 22 and 23 are included for this purpose. The tapping points 27, 28 and 29 are connected, respectively, through the dropping resistors 53, 54 and 55 either to the leading-voltage points 36, 42 and 48, as shown, or to the lagging-voltage points 38, 44 and 49. Adjustment of these tapping points 27, 28 and 29 controls three harmonically related, cosine-shaped loss deviation shapes and three associated, harmonically related, cosine-shaped minimum-phase, delay deviation shapes. If the connections are made to the points 36, 42 and 48, as shown, the associated delay will be negative, that is, it will be the negative of the delay produced by a minimum-phase circuit producing the same loss. This is the preferred embodiment for use with a system comprising a transmission line and a fixed delay equalizer. In this case, there will be no special relationship between the over-all loss and delay distortion of the combination of line and fixed delay equalizer. The adjustable equalizer will have the maximum range, which is specially desirable if the delay networks 10 to 15 introduce considerable loss.

On the other hand, if the connections for the combined loss-and-delay shapes are made to the lagging-voltage points 38, 44 and 49, instead of the points 36, 42 and 48, the associated delay will be positive. This embodiment is preferred for use with a system which does not include a fixed delay equalizer. Under these circumstances, the delay distortion associated with the loss distortion of the line to be equalized will ordinarily be of the minimum-phase type. Therefore, equalization of the loss distortion by the loss-and-delay shapes will automatically reduce the delay distortion, thereby requiring less range for the pure delay shapes.

In the operation of the adjustable equalizer, the combined loss-and-phase shapes are preferably adjusted first, as mentioned above. That is, the tapping points 27, 28 and 29 are adjusted one at a time. If the pairs of voltages provide pure delay equalization, that is, if there is no phase reversal in the hybrid 6, the combined shapes are adjusted to minimize or eliminate the loss distortion without considering the delay distortion. Then, the tapping points 30, 31 and 32 are adjusted to minimize or eliminate all of the delay distortion. On the other hand, if the pairs of voltages provide pure loss equalization, the combined shapes are adjusted for optimum delay equalization without consideration of the loss distortion. Then, the tapping points 30, 31 and 32 are adjusted for optimum loss equalization. In either case, if the adjustments are made in this sequence, no readjustment of the combined shapes is ordinarily required.

It is to be understood that the above-described arrangements are only illustrative of the application of the principles of the invention. Numerous other arrangements may be devised by those skilled in the art without departing from the spirit and scope of the invention. For example, additional pairs of delay networks and associated elements may be added if more than three harmonically related shapes are required. If a sufficient number of shapes are provided, any loss or delay characteristic may be simulated as nearly as desired.

What is claimed is:

1. An adjustable equalizer comprising a terminated, unbalanced delay line, a balanced summing circuit including a plurality of shunt resistors each with an adjustable tapping point, means for deriving a main signal from the center of said line and impressing it upon said circuit, means for deriving a series of leading voltages from spaced points in one half of said line, means for deriving a corresponding series of lagging voltages from spaced points in the other half of said line, means for impressing each of the corresponding pairs of said voltages upon a different one of a part of said tapping points, and means for impressing one of said series of voltages individually upon the rest of said tapping points.

2. An equalizer in accordance with claim 1 in which said first-mentioned means include a hybrid device.

3. An equalizer in accordance with claim 1 in which said first-mentioned means include a device for attenuating said main signal.

4. An equalizer in accordance with claim 1 which includes means for attenuating each of said leading voltages and each of said lagging voltages.

5. An equalizer in accordance with claim 4 in which said attenuating means associated with said leading voltages provide impedance transformation.

6. An equalizer in accordance with claim 1 in which said summing circuit includes an unbalanced-to-balanced transformer at the input end thereof.

7. An equalizer in accordance with claim 1 in which said delay line comprises an even number of delay networks connected in tandem.

8. An equalizer in accordance with claim 7 in which each of said networks has a phase characteristic which is substantially linear with frequency in the band to be equalized.

9. An equalizer in accordance with claim 7 in which each of said networks has a phase shift which increases by an integral multiple of 180 degrees over the band to be equalized.

10. An equalizer in accordance with claim 7 in which said networks have phase shifts which are equal in pairs and the networks forming each of the pairs are symmetrically positioned about said center.

11. An equalizer in accordance with claim 1 in which said one series of voltages are said leading voltages.

12. An equalizer in accordance with claim 1 which includes means for reversing the phase of the signal as it is transmitted from the first half to the second half of said line.

13. An equalizer in accordance with claim 1 in which there is no phase reversal introduced at the center of said line.

14. An adjustable equalizer comprising a terminated, unbalanced delay line, a balanced summing circuit including an unbalanced-to-balanced transformer at the input end thereof and a plurality of shunt resistors each with an adjustable tapping point, means for deriving a main signal from the center of said line, means including an attenuating pad for impressing said signal upon the primary of said transformer, means for deriving a series of leading voltages from spaced points in one half of said line, means for deriving a corresponding series of lagging voltages from spaced points in the other half of said line, means for attenuating each of said voltages, the attenuated voltages forming each of the corresponding pairs being substantially equal, means for impressing each of said pairs of voltages upon a different one of a part of said tapping points, and means for attenuating and impressing one of said series of voltage individually upon the rest of said tapping points.

15. An equalizer in accordance with claim 14 in which said first-mentioned means include a hybrid device.

16. An equalizer in accordance with claim 14 in which said attenuating means associated with said leading voltages provide impedance transformation.

17. An equalizer in accordance with claim 14 in which said delay line comprises an even number of delay networks connected in tandem.

18. An equalizer in accordance with claim 17 in which each of said networks has a substantially linear phase-frequency characteristic in the band to be equalized.

19. An equalizer in accordance with claim 17 in which each of said networks has a phase shift which increases by an integral multiple of 180 degrees over the band to be equalized.

20. An equalizer in accordance with claim 17 in which said networks have phase shifts which are equal in pairs and the networks forming each of the pairs are symmetrically positioned about said center.

21. An equalizer in accordance with claim 14 in which said one series of voltages are said leading voltages.

22. An equalizer in accordance with claim 14 which includes means for reversing the phase of the signal as it is transmitted from the first half to the second half of said line.

23. An equalizer in accordance with claim 14 in which there is no phase reversal introduced at the center of said line.

No references cited.